United States Patent
Hu

(10) Patent No.: US 12,118,760 B2
(45) Date of Patent: Oct. 15, 2024

(54) POINT CLOUD ENCODING AND DECODING METHOD AND APPARATUS, COMPUTER-READABLE MEDIUM, AND ELECTRONIC DEVICE

(71) Applicant: Tencent Technology (Shenzhen) Company Limited, Guangdong (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 10 days.

(21) Appl. No.: 17/982,927

(22) Filed: Nov. 8, 2022

(65) Prior Publication Data

US 2023/0061573 A1 Mar. 2, 2023

Related U.S. Application Data

(63) Continuation of application No. PCT/CN2022/080266, filed on Mar. 11, 2022.

(30) Foreign Application Priority Data

Apr. 22, 2021 (CN) .......................... 202110437255.4

(51) Int. Cl.
*G06T 9/00* (2006.01)
*H04L 65/70* (2022.01)

(52) U.S. Cl.
CPC .............. *G06T 9/001* (2013.01); *H04L 65/70* (2022.05)

(58) Field of Classification Search
CPC ........... G06T 9/001; G06T 9/00; H04L 65/70; H04L 65/762; H04L 65/612;
(Continued)

(56) References Cited

U.S. PATENT DOCUMENTS

| 2019/0139266 A1 | 5/2019 | Budagavi et al. |
| 2020/0132822 A1 | 4/2020 | Pimentel et al. |

(Continued)

FOREIGN PATENT DOCUMENTS

| CN | 110012279 A | 7/2019 |
| CN | 110796724 A | 2/2020 |

(Continued)

OTHER PUBLICATIONS

Office Action issued on Chinese Application 202110437255.4 on Aug. 7, 2023, 9 pages.

(Continued)

*Primary Examiner* — Tan Doan
(74) *Attorney, Agent, or Firm* — Crowell & Moring LLP

(57) ABSTRACT

The present subject matter relates to point cloud encoding and decoding methods and apparatuses. A point cloud file transmitted by a data source is received. The point cloud file comprises point cloud media tracks having the same point cloud content and point cloud media tracks having different frame rates. File encapsulation information of the point cloud media tracks are parsed to obtain frame rate indication information carried in the file encapsulation information. The frame rate indication information indicates frame rates of the point cloud media tracks. A point cloud media track with a designated frame rate is selected and decoded from the point cloud file according to the frame rate indication information carried in the file encapsulation information.

15 Claims, 7 Drawing Sheets

(58) Field of Classification Search
CPC .. H04N 19/102; H04N 19/463; H04N 19/597; H04N 19/20; H04N 19/70; H04N 19/13; H04N 19/172; H04N 19/184; H04N 19/436; H04N 19/46
USPC ............................................. 709/227
See application file for complete search history.

(56) References Cited

U.S. PATENT DOCUMENTS

| | | | |
|---|---|---|---|
| 2021/0019936 A1 | 1/2021 | Oyman | |
| 2021/0194946 A1* | 6/2021 | Hannuksela | ....... H04N 21/8456 |
| 2022/0028157 A1* | 1/2022 | Cabral | ................... H04N 7/157 |
| 2022/0036593 A1 | 2/2022 | Takahashi et al. | |

FOREIGN PATENT DOCUMENTS

| | | |
|---|---|---|
| CN | 114079781 A | 2/2022 |
| WO | WO 2020/060813 A1 | 3/2020 |
| WO | WO 2020/137642 A1 | 7/2020 |
| WO | WO 2021/022266 A | 2/2021 |

OTHER PUBLICATIONS

International Search Report (PCT/ISA/210) issued in PCT Application No. PCT/CN2022/080266 dated May 30, 2022 with English translation (four (4) pages).
Chinese-language Written Opinion (PCT/ISA/237) issued in PCT Application No. PCT/CN2022/080266 dated May 30, 2022 (four (4) pages).

* cited by examiner

POINT CLOUD ENCODING AND DECODING METHOD AND APPARATUS, COMPUTER-READABLE MEDIUM, AND ELECTRONIC DEVICE

RELATED APPLICATION

This application is a continuation of PCT Application PCT/CN2022/080266 filed Mar. 11, 2022, which claims priority to Chinese Patent Application No. 202110437255.4, entitled "POINT CLOUD ENCODING AND DECODING METHOD AND RELATED DEVICE" and filed on Apr. 22, 2021, which is incorporated herein by reference in its entirety.

TECHNICAL FIELD

The present subject matter relates to the field of computer and communication technologies, and specifically, to a point cloud encoding and decoding method, a point cloud encoding and decoding apparatus, a non-transitory computer-readable medium, and an electronic device.

BACKGROUND

A point cloud is a set of discrete points that are irregularly distributed in space and express the spatial structure and surface attributes of a three-dimensional object or scene. After massive point cloud data is obtained through a point cloud collection device, the point cloud data may be encoded and encapsulated, to be transmitted and presented to a user.

BRIEF SUMMARY

Examples of the present subject matter provide a point cloud encoding and decoding method, a point cloud encoding and decoding apparatus, a non-transitory computer-readable medium, and an electronic device.

According to an aspect of the examples of the present subject matter, a point cloud decoding method is provided, including: receiving a point cloud file transmitted by a data source, the point cloud file including one or more point cloud media tracks having the same point cloud content, and the point cloud file including some point cloud media tracks having different frame rates; parsing file encapsulation information of the one or more point cloud media tracks, to obtain frame rate indication information carried in the file encapsulation information, the frame rate indication information indicating frame rates of the one or more point cloud media tracks; and selecting and decoding a point cloud media track with a designated frame rate from the point cloud file according to the frame rate indication information carried in the file encapsulation information.

According to an aspect of the examples of the present subject matter, a point cloud decoding apparatus is provided, including: a receiving module, configured to receive a point cloud file transmitted by a data source, the point cloud file including one or more point cloud media tracks having the same point cloud content, and the point cloud file including some point cloud media tracks having different frame rates; a parsing module, configured to parse file encapsulation information of the one or more point cloud media tracks, to obtain frame rate indication information carried in the file encapsulation information, the frame rate indication information indicating frame rates of the one or more point cloud media tracks; and a decoding module, configured to select and decode a point cloud media track with a designated frame rate from the point cloud file according to the frame rate indication information carried in the file encapsulation information.

In some examples of the present subject matter, based on the above technical solutions, the receiving module includes: a signaling receiving unit, configured to receive streaming media signaling that is transmitted by the data source and that is used for transmitting point cloud data; a signaling parsing unit, configured to parse the streaming media signaling, to obtain a temporal scale group identifier used for identifying a track group and carried in the streaming media signaling, where the track group includes one or more point cloud media tracks having the same point cloud content, and the track group includes some point cloud media tracks having different frame rates; a request transmitting unit, configured to transmit a first data transmission request to the data source according to the temporal scale group identifier; and a file receiving unit, configured to receive the point cloud file that is transmitted by the data source and that corresponds to the first data transmission request.

In some examples of the present subject matter, based on the above technical solutions, the request transmitting unit includes: a bandwidth obtaining subunit, configured to obtain a network bandwidth of performing data transmission with the data source; a track selecting subunit, configured to select one or more target point cloud media tracks having a target frame rate and matching the network bandwidth from the track group according to the temporal scale group identifier; and a request transmitting subunit, configured to transmit, to the data source, the first data transmission request used for requesting to transmit the one or more target point cloud media tracks.

In some examples of the present subject matter, based on the above technical solutions, the parsing module includes: an information parsing unit, configured to parse the file encapsulation information of the one or more point cloud media tracks, to determine frame rate indication fields corresponding to frame rates of the one or more point cloud media tracks; and an information determining unit, configured to determine the frame rate indication information of the one or more point cloud media tracks according to values of the frame rate indication fields.

In some examples of the present subject matter, based on the above technical solutions, the point cloud decoding apparatus further includes: a frame rate obtaining module, configured to obtain a frame rate of a to-be-presented point cloud media track; a track selecting module, configured to select another point cloud media track having the same frame rate as that of the to-be-presented point cloud media track from the point cloud file according to the frame rate indication information carried in the file encapsulation information; and a first replacing module, configured to replace the to-be-presented point cloud media track with the another point cloud media track, to decode and present the another point cloud media track.

In some examples of the present subject matter, based on the above technical solutions, the point cloud decoding apparatus further includes: a frame rate obtaining module, configured to obtain a frame rate of a to-be-presented point cloud media track; a track selecting module, configured to select one or more other point cloud media tracks having the same frame rate as that of the to-be-presented point cloud media track from the point cloud file according to the frame rate indication information carried in the file encapsulation information; and a first merging module, configured to decode the one or more other point cloud media tracks, and merge and present the one or more other point cloud media tracks and the to-be-presented point cloud media track.

In some examples of the present subject matter, based on the above technical solutions, the point cloud decoding apparatus further includes: a frame rate obtaining module, configured to obtain a frame rate of a to-be-presented point cloud media track; a file obtaining module, configured to transmit a second data transmission request to the data source, to receive a supplementary point cloud file transmitted by the data source, where the supplementary point cloud file includes another point cloud media track having the same point cloud content and the same frame rate as those of the to-be-presented point cloud media track; and a second replacing module, configured to replace the to-be-presented point cloud media track with the another point cloud media track, to decode and present the another point cloud media track.

In some examples of the present subject matter, based on the above technical solutions, the point cloud decoding apparatus further includes: a frame rate obtaining module, configured to obtain a frame rate of a to-be-presented point cloud media track; a file obtaining module, configured to transmit a third data transmission request to the data source, to receive a supplementary point cloud file transmitted by the data source, where the supplementary point cloud file includes one or more other point cloud media tracks having the same point cloud content and the same frame rate as those of the to-be-presented point cloud media track; and a second merging module, configured to decode the one or more other point cloud media tracks, and merge and present the one or more other point cloud media tracks and the to-be-presented point cloud media track.

According to an aspect of the examples of the present subject matter, a point cloud encoding method is provided, including: encoding to-be-transmitted point cloud data according to different encoding standards, to obtain a plurality of point cloud bitstreams having the same point cloud content, the plurality of point cloud bitstreams including some point cloud bitstreams having different frame rates; and encapsulating the plurality of point cloud bitstreams as a plurality of point cloud media tracks, and filling the plurality of point cloud media tracks with frame rate indication information corresponding to the plurality of point cloud bitstreams, the frame rate indication information indicating frame rates of the plurality of point cloud media tracks.

According to an aspect of the examples of the present subject matter, a point cloud encoding apparatus is provided, including: an encoding module, configured to encode to-be-transmitted point cloud data according to different encoding standards, to obtain a plurality of point cloud bitstreams having the same point cloud content, the plurality of point cloud bitstreams including some point cloud bitstreams having different frame rates; and an encapsulating module, configured to encapsulate the plurality of point cloud bitstreams as a plurality of point cloud media tracks, and fill the plurality of point cloud media tracks with frame rate indication information corresponding to the plurality of point cloud bitstreams, the frame rate indication information indicating frame rates of the plurality of point cloud media tracks.

In some examples of the present subject matter, based on the above technical solutions, the point cloud encoding apparatus further includes: a signaling generating module, configured to generate streaming media signaling used for transmitting the point cloud data; a signaling filling module, configured to fill the streaming media signaling with a temporal scale group identifier used for identifying a track group, where the track group includes one or more point cloud media tracks having the same point cloud content, and the track group includes some point cloud media tracks having different frame rates; a signaling transmitting module, configured to transmit the streaming media signaling to a data receiver.

In some examples of the present subject matter, based on the above technical solutions, the point cloud encoding apparatus further includes: a request receiving module, configured to receive a data transmission request generated based on the streaming media signaling and transmitted by the data receiver; and a file transmission module, configured to transmit a point cloud file to the data receiver according to the data transmission request, the point cloud file including one or more point cloud media tracks having the same point cloud content, and the point cloud file including some point cloud media tracks having different frame rates.

In some examples of the present subject matter, based on the above technical solutions, the encapsulating module includes: an information determining unit, configured to determine, in file encapsulation information of the plurality of point cloud media tracks, frame rate indication fields corresponding to the frame rate indication information; and an information filling unit, configured to fill the frame rate indication fields in the file encapsulation information with the frame rate indication information corresponding to the plurality of point cloud bitstreams.

According to an aspect of the examples of the present subject matter, a non-transitory computer-readable medium is provided, storing a computer program, the computer program, when executed by a processor, implementing the method in the above technical solutions.

According to an aspect of the examples of the present subject matter, an electronic device is provided, including: a processor; and a memory, configured to store executable instructions of the processor, the processor being configured to perform the method in the above technical solutions by executing the executable instructions.

According to an aspect of the examples of the present subject matter, a computer program product or a computer program is provided. The computer program product or the computer program includes computer instructions, and the computer instructions are stored in a non-transitory computer-readable storage medium. A processor of a computer device reads the computer instructions from the computer-readable storage medium, and executes the computer instructions, so that the computer device performs the method in the above technical solutions.

In the technical solutions provided in the examples of the present subject matter, by associating point cloud media resources having the same frame rate with point cloud media resources having different frame rates, a temporally progressive relationship of point cloud media is constructed. Based on this temporally progressive relationship, when consuming point cloud media, a user may request a corresponding point cloud file as required, thereby saving the transmission network bandwidth and improving the point cloud data encoding and decoding flexibility.

DETAILED DESCRIPTION

Figure 1:
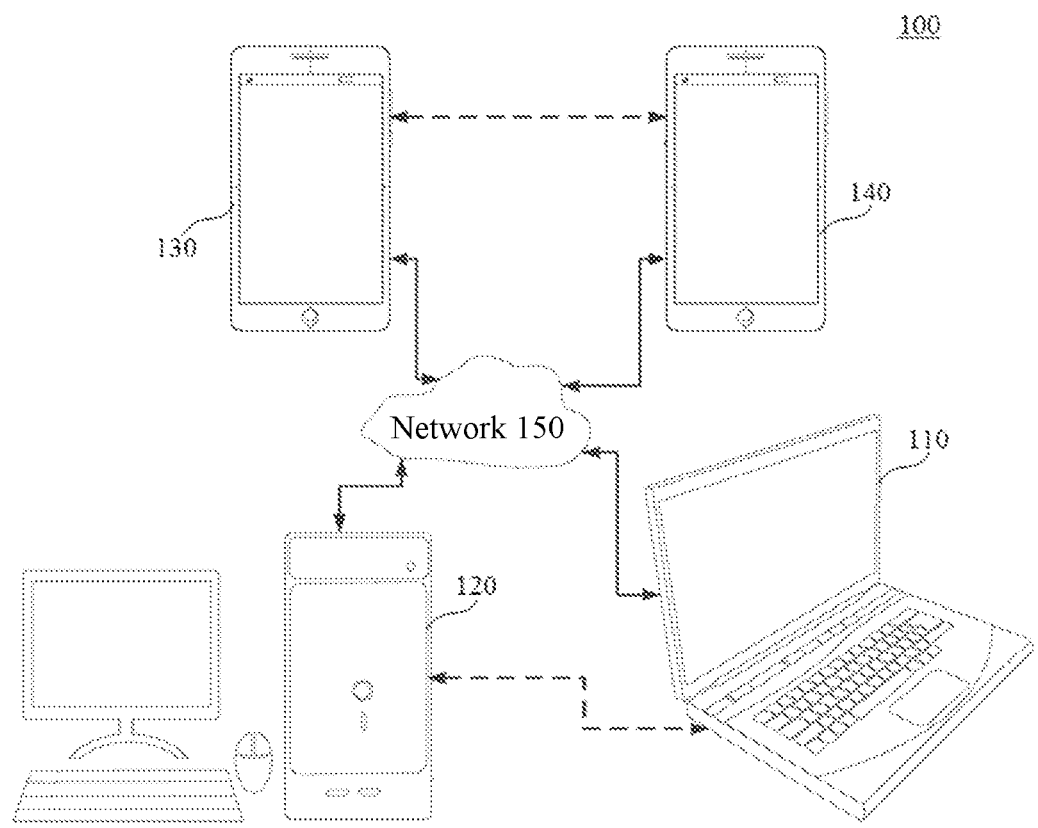
FIG. 1 is a schematic diagram of an example system architecture to which a technical solution according to an example of the present subject matter is applicable.

Now, example implementations are described comprehensively with reference to the accompanying drawings. However, the example implementations may be implemented in various forms, and are not limited to the examples described herein. Instead, the implementations are provided to make the present subject matter more thorough and complete and fully convey the idea of the example implementations to a person skilled in the art.

In addition, the described features, structures, or characteristics may be combined in one or more examples in any appropriate manner. In the following descriptions, a lot of specific details are provided to give a full understanding of the examples of the present subject matter. However, a person skilled in the art is to be aware of that, the technical solutions in the present subject matter may be implemented without one or more of the particular details, or other methods, unit, apparatus, or step may be adopted. In other cases, well-known methods, apparatuses, implementations, or operations are not shown or described in detail, to avoid obscuring the aspects of the present subject matter.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

A point cloud is a set of discrete points that are irregularly distributed in space and express the spatial structure and surface attributes of a three-dimensional object or scene. Each point in the point cloud has at least three-dimensional position information, and may further have color information, material information or other information according to different application scenarios. Usually, all points in the point cloud have the same number of additional attributes. Point cloud media encoding manners may be further divided into Video-based Point Cloud Compression (VPCC) and Geometry-based Point Cloud Compression (GPCC). During point cloud file encapsulation, three-dimensional position information is usually referred to as a geometry component of a point cloud file, and attribute information is referred to as an attribute component of the point cloud file. One point cloud file may have only one geometry component, but may have one or more attribute components.

The point cloud may flexibly and conveniently express the spatial structure and surface attributes of the three-dimensional object or scene, and therefore is applied widely, and main application scenarios of the point cloud may be classified as two main categories. 1) Machine perception point cloud, for example, an autonomous navigation system, a real-time preventive maintenance inspection system, a geographic information system, a vision sorting robot, or a rescue and relief robot. 2) Human eye perception point cloud, for example, digital culture heritage, free viewpoint broadcasting, three-dimensional immersion communication, three-dimensional immersion interaction, or another point cloud application scenario.

The point cloud is obtained mainly using the following approaches: computer generating, 3D laser scanning, 3D photogrammetry and the like. A computer may generate a point cloud of a virtual three-dimensional object or scene. 3D scanning may obtain a point cloud of a static real-world three-dimensional object or scene, and may obtain a million-level point cloud per second. 3D photographing may obtain a point cloud of a dynamic real-world three-dimensional object or scene, and may obtain a ten-million-level point cloud per second. Moreover, in the medical field, a point cloud of a biological tissue or organ may be obtained according to MRI, CT, or electromagnetic positioning information. These technologies reduce the costs and period of obtaining point cloud data, and improve precision of the data. A revolution in point cloud data obtaining manners makes it possible to obtain a large quantity of point cloud data. With continuous accumulation of a huge mass of point cloud data, efficient storage, transmission, publishing, sharing and standardization of the point cloud data become a key to point cloud application.

After point cloud media are encoded, an encoded data stream needs to be encapsulated and transmitted to a user. Correspondingly, at the end of a point cloud media player, a point cloud file needs to be first decapsulated and then decoded, and finally the decoded data stream is presented.

FIG. 1 is a schematic diagram of an example system architecture to which a technical solution according to an example of the present subject matter is applicable.

As shown in FIG. 1, the system architecture 100 includes a plurality of terminal apparatuses, and the terminal apparatuses may communicate with each other through, for example, a network 150. For example, the system architecture 100 may include a first terminal apparatus 110 and a second terminal apparatus 120 interconnected through the network 150. In the example in FIG. 1, the first terminal apparatus 110 and the second terminal apparatus 120 perform unidirectional data transmission.

For example, the first terminal apparatus 110 may encode point cloud data (for example, a point cloud bitstream collected by the first terminal apparatus 110) and transmit the encoded point cloud data to the second terminal apparatus 120 through the network 150, the encoded point cloud data is transmitted in the form of one or more encoded point cloud bitstreams, and the second terminal apparatus 120 may receive the encoded point cloud data from the network 150, decode the encoded point cloud data and display the decoded point cloud data.

In an example of the present subject matter, the system architecture 100 may include a third terminal apparatus 130 and a fourth terminal apparatus 140 that perform bidirectional transmission on the encoded point cloud data, and the bidirectional transmission may occur, for example, during a video conference. For bidirectional data transmission, one of the third terminal apparatus 130 and the fourth terminal apparatus 140 may encode point cloud data (for example, a point cloud bitstream collected by the terminal apparatus), and transmit the encoded point cloud data to the other of the third terminal apparatus 130 and the fourth terminal apparatus 140 through the network 150. The one of the third terminal apparatus 130 and the fourth terminal apparatus 140 may further receive the encoded point cloud data transmitted by the other of the third terminal apparatus 130 and the fourth terminal apparatus 140, and may decode the encoded point cloud data to restore the point cloud data, and may display the point cloud data on an accessible display apparatus according to the restored point cloud data.

In the example in FIG. 1, each of the first terminal apparatus 110, the second terminal apparatus 120, the third terminal apparatus 130 and the fourth terminal apparatus 140 may be a server, a personal computer or a smartphone, but the principle disclosed in the present subject matter may not be limited thereto. This example disclosed in the present subject matter is applicable to a laptop computer, a tablet computer, a media player and/or a dedicated video conference device. The network 150 represents any number of networks that transfer the encoded point cloud data between the first terminal apparatus 110, the second terminal apparatus 120, the third terminal apparatus 130 and the fourth terminal apparatus 140, and includes, for example, a wired communication network and/or a wireless communication network. The network 150 may exchange data in a circuit switched channel and/or a packet switched channel. The network may include a telecommunication network, a local area network, a wide area network and/or the Internet. For the purpose of the present subject matter, unless otherwise explained below, the architecture and topology of the network 150 may be insignificant for operations disclosed in the present subject matter.

Figure 2:
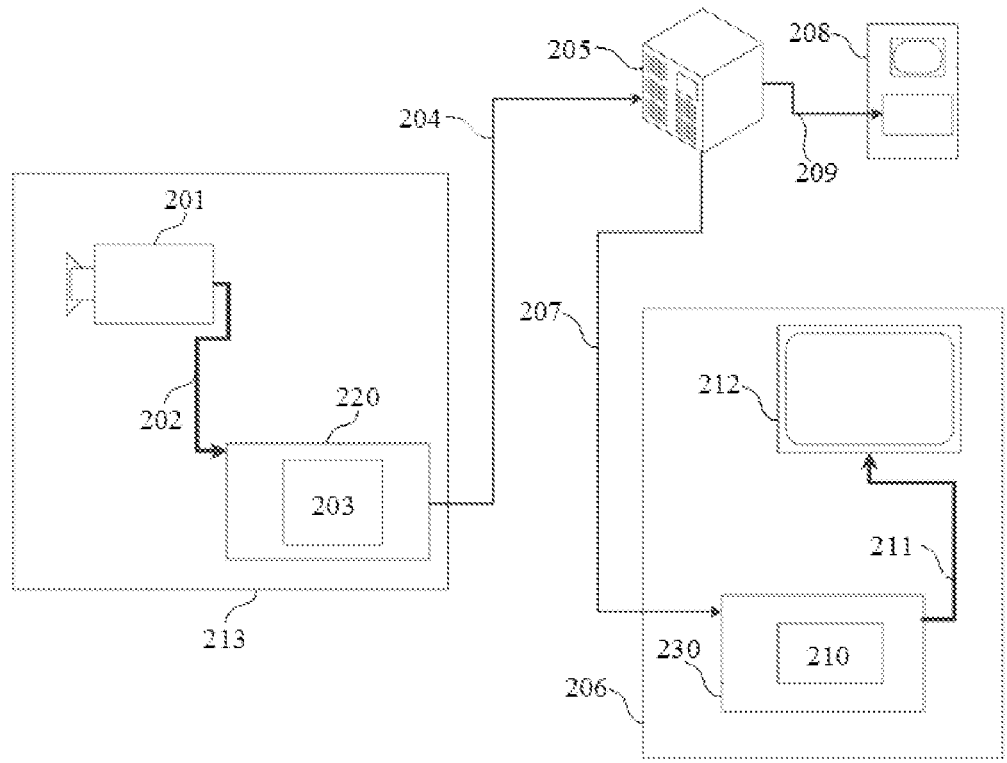
FIG. 2 shows placement manners of a point cloud encoding apparatus and a point cloud decoding apparatus in a streaming transmission environment.

In an example of the present subject matter, FIG. 2 shows placement manners of a point cloud encoding apparatus and a point cloud decoding apparatus in a streaming transmission environment. The subject matter disclosed in the present subject matter may be equally applicable to other applications supporting a point cloud, including, for example, a video conference, a digital television, and storage of compressed point cloud data on non-transitory digital mediums including a CD, a DVD, a memory stick and the like.

A streaming transmission system may include a collection sub-system 213, the collection sub-system 213 may include a point cloud data source 201 such as a digital camera, and the point cloud data source 201 may create, for example, uncompressed point cloud data 202. In this example, the point cloud data 202 includes a sample photographed by the digital camera. Compared with encoded point cloud data 204 (or encoded point cloud bitstream 204), the point cloud data 202 is depicted as a bold line to emphasize point cloud data of a high data volume, the point cloud data 202 may be processed by an electronic apparatus 220, and the electronic apparatus 220 includes a video encoding apparatus 203 coupled to the video source 201. The video encoding apparatus 203 may include hardware, software or a combination of software and hardware to realize or implement aspects of the disclosed subject matter described below in more detail. Compared with the point cloud data 202, the encoded point cloud data 204 (or the encoded point cloud bitstream 204) is depicted as a fine line to emphasize the encoded point cloud data 204 (or the encoded point cloud bitstream 204) of a relatively low data volume, and may be stored on a streaming transmission server 205 for future use. One or more streaming transmission client sub-systems, for example, a client sub-system 206 and a client sub-system 208 in FIG. 2 may access the streaming transmission server 205 to retrieve point cloud data 207 and point cloud data 209 that are encoded and used as duplicates of the point cloud data 204. The client sub-system 206 may include, for example, a point cloud decoding apparatus 210 in an electronic apparatus 230. The point cloud decoding apparatus 210 decodes the inputted duplicate 207 of the encoded point cloud data, and generates outputted point cloud data 211 that may be presented on a display 212 (for example, a display screen) or another presentation apparatus. In some streaming transmission systems, the encoded point cloud data 204, point cloud data 207 and point cloud data 209 (for example, point cloud bitstreams) may be encoded according to some point cloud encoding/compression standards. An example of these standards may include a standard developed by MPEG for GPCC.

The electronic apparatus 220 and the electronic apparatus 230 may include other components not shown in the drawing. For example, the electronic apparatus 220 may include a point cloud decoding apparatus, and the electronic apparatus 230 may further include a point cloud encoding apparatus.

Technical solutions such as a point cloud encoding and decoding method, a point cloud encoding and decoding apparatus, a non-transitory computer-readable medium, and an electronic device provided in the present subject matter are described below in detail with reference to specific implementations.

Figure 3:
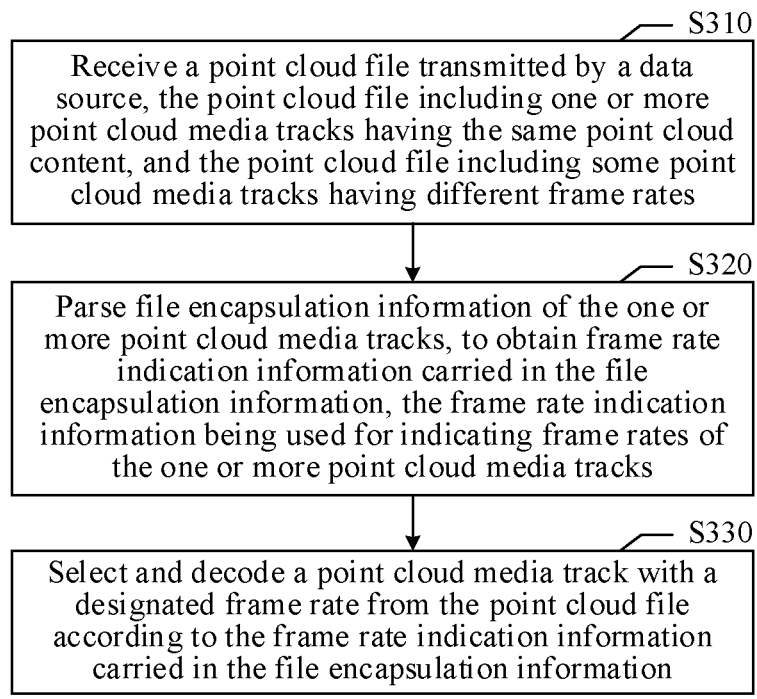
FIG. 3 is a step flowchart of a point cloud decoding method according to an example of the present subject matter.

FIG. 3 is a step flowchart of a point cloud decoding method according to an example of the present subject matter. The method may be applied to links of a point cloud media system, such as a server, a client and an intermediate node. In this example of the present subject matter, the point cloud decoding method performed by a client device in which a point cloud decoding apparatus is installed is used as an example. As shown in FIG. 3, the point cloud decoding method may mainly include the following step S310 to step S330.

Step S310: Receive a point cloud file transmitted by a data source, the point cloud file including one or more point cloud media tracks having the same point cloud content, and the point cloud file including some point cloud media tracks having different frame rates.

In an example of the present subject matter, in the point cloud file, one point cloud media track corresponding to a designated frame rate may be individually encapsulated, or a plurality of point cloud media tracks having the same frame rate or different frame rates may be encapsulated. A plurality of point cloud media tracks may form one track group, and content of the track group may include point cloud media tracks (including a geometry component and an attribute component) in a single-track encapsulating mode or may include geometry component tracks in a multi-track encapsulating mode (attribute component tracks are obtained by indexing the geometry component tracks). Point cloud media tracks having the same frame rate may be replaced with each other during decoding and presentation, and the point cloud media tracks having the same frame rate may be combined and consumed, to achieve a better point cloud presentation effect.

In an example of the present subject matter, some point cloud media tracks in the point cloud file have the same frame rate, while other point cloud media tracks may have different frame rates. For example, three point cloud media tracks track1, track2 and track3 are encapsulated in the point cloud file, where a frame rate of track1 is 60 fps, while a frame rate of each of track2 and track3 is 30 fps.

may include: parsing the file encapsulation information of the one or more point cloud media tracks, to determine frame rate indication fields corresponding to frame rates of the one or more point cloud media tracks; and determining the frame rate indication information of the one or more point cloud media tracks according to values of the frame rate indication fields.

In an example of the present subject matter, file encapsulation information is an ISO base media file format (ISOBMFF) data box generated when a point cloud bitstream is encapsulated as a point cloud media track, and for specific content of the ISOBMFF, reference may be made to the international standard ISO/IEC 14496-12.

In an example of the present subject matter, file encapsulation information may be specifically expressed as a track group data box TrackGroupTypeBox obtained by extension, and a syntax thereof is as follows:

```
aligned(8) class GPCCTemporal Seal eBox extends TrackGroupTypeBox('gpts') {
    //track_group_id is inherited from TrackGroupTypeBox;
    unsigned int(8) frame_rate;
}
```

Alternative groups corresponding to different point cloud media tracks may be encapsulated in the point cloud file, and point cloud media tracks having the same point cloud content and having different point cloud quality may be arranged in the same alternative group. The point cloud quality may include various quality parameters corresponding to different standards such as a bitrate, a frame rate, a resolution and the like.

When GPCC point cloud data is encapsulated using a single track, tracks of point cloud content with different quality all belong to the same alternative group. When GPCC point cloud data is encapsulated using a plurality of tracks, geometry component tracks of point cloud content with different quality all belong to the same alternative group, and attribute component tracks may be associated with the geometry component tracks.

Figure 4:
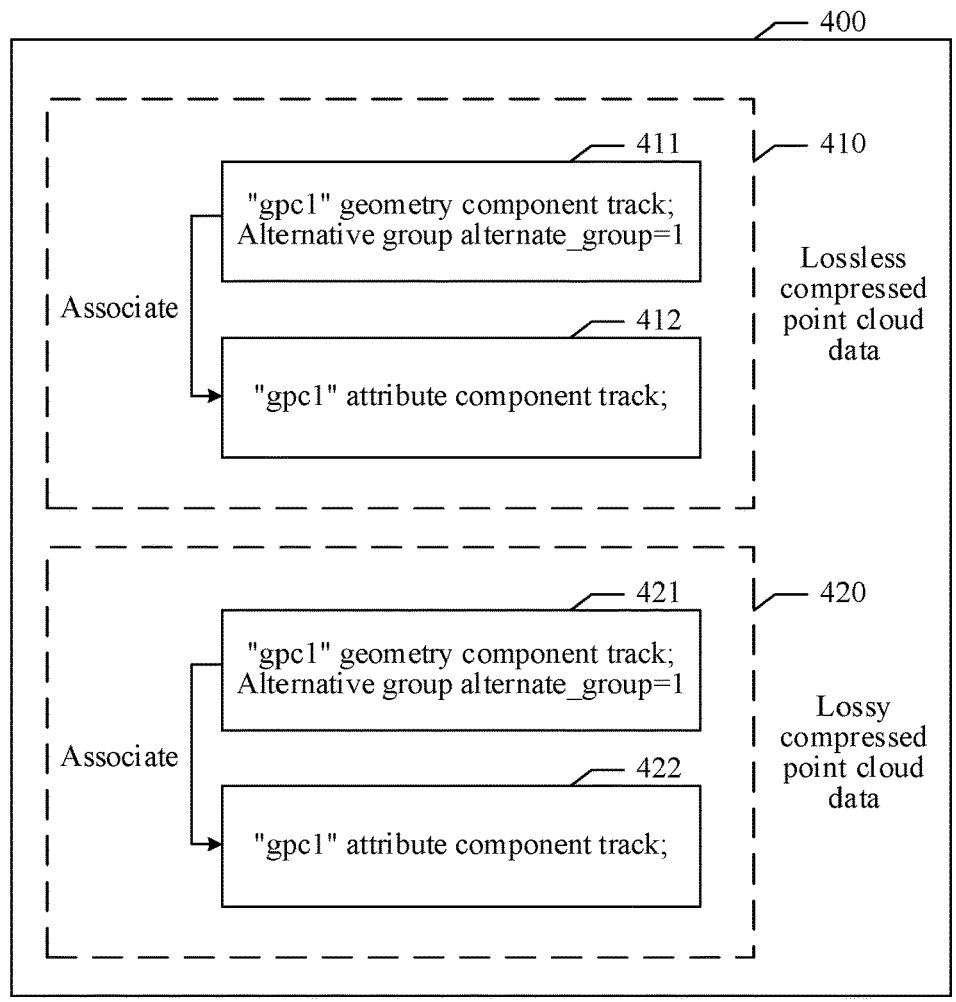
FIG. 4 is a schematic diagram of a multi-track encapsulated alternative group according to an example of the present subject matter.

FIG. 4 is a schematic diagram of a multi-track encapsulated alternative group according to an example of the present subject matter. As shown in FIG. 4, an alternative group 400 includes a first point cloud data 410 and a second point cloud data 420 that have the same point cloud content. The first point cloud data 410 is lossless compressed point cloud data (Lossless coded GPCC) whose point cloud quality is relatively high, and the second point cloud data 420 is lossy compressed point cloud data (Lossy coded GPCC) whose point cloud quality is relatively low.

The first point cloud data 410 includes a first geometry component track 411 and a first attribute component track 412 associated with the first geometry component track 411, and the second point cloud data 420 includes a second geometry component track 421 and a second attribute component track 422 associated with the second geometry component track 421.

Step S320: Parse file encapsulation information of the one or more point cloud media tracks, to obtain frame rate indication information carried in the file encapsulation information, the frame rate indication information indicating frame rates of the one or more point cloud media tracks.

In an example of the present subject matter, the method for parsing file encapsulation information to obtain quality indication information (frame rate indication information)

where frame_rate is frame rate indication information used for indicating a frame rate corresponding to the point cloud file, and a value thereof is an unsigned integer whose length is 8 bytes.

By extending the track group data box, point cloud media tracks having the same content but different frame rates may be associated with each other. Point cloud media tracks belonging to the same track group meet the following conditions.

(1) Tracks are point cloud media tracks (including a geometry component and an attribute component) in a single-track encapsulating mode or geometry component tracks in a multi-track encapsulating mode (attribute component tracks are obtained by indexing the geometry component tracks).

(2) Tracks having the same frame rate may be replaced with each other during decoding and presentation.

(3) Tracks having the same frame rate may be combined and consumed, to achieve a presentation effect with a higher frame rate.

Step S330: Select and decode a point cloud media track with a designated frame rate from the point cloud file according to the frame rate indication information carried in the file encapsulation information.

File encapsulation information corresponding to each point cloud media track carries frame rate indication information of the point cloud media track, and the frame rate indication information identifies a frame rate of the point cloud media track in an explicit identification manner. When the point cloud file is transmitted by the data source to a data receiver of the user, the data receiver may decode a point cloud media track with a designated frame rate according to device performance and user requirements.

In an example of the present subject matter, by collecting device performance of the data receiver and performing matching detection on the device performance and the quality indication information (frame rate indication information) carried in the file encapsulation information, a frame rate matching the device performance of the data receiver may be determined, and then a point cloud media track with the designated frame rate is selected from the point cloud file and decoded.

The device performance may include at least one of hardware performance, software performance and network performance. The hardware performance may include, for example, the device model of the electronic device, the processor model, the memory capacity, the display size and the like. The software performance may include, for example, the program version of the point cloud decoder installed in the data receiver. The network performance may include, for example, the network bandwidth, the network transmission state and the like.

In an example of the present subject matter, by obtaining a frame rate selection rule configured by the data receiver and performing matching detection on the frame rate selection rule and the frame rate indication information carried in the file encapsulation information, a frame rate matching the frame rate selection rule configured by the data receiver may be determined, and then a point cloud media track with the designated frame rate is selected from the point cloud file and decoded.

The frame rate selection rule may be a selection rule that is used for selecting point cloud data with a designated frame rate and that is configured according to user requirements, for example, selecting point cloud data whose frame rate is greater than (or less than) a designated value according to a user instruction.

Figure 5:
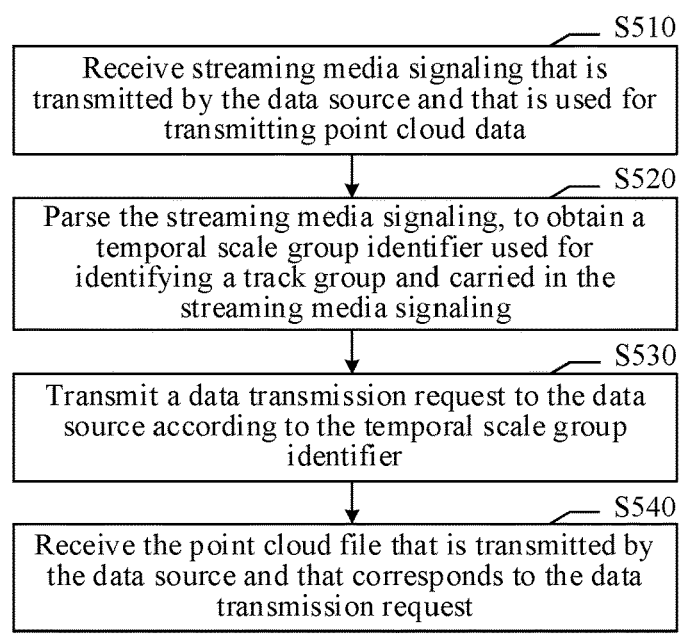
FIG. 5 is a step flowchart of receiving a point cloud file from a data source according to an example of the present subject matter.

FIG. 5 is a step flowchart of receiving a point cloud file from a data source according to an example of the present subject matter. As shown in FIG. 5, based on the above examples, the receiving a point cloud file transmitted by a data source in step S310 may include the following step S510 to step S540.

Step S510: Receive streaming media signaling that is transmitted by the data source and that is used for transmitting point cloud data.

In an example of the present subject matter, the streaming media signaling used for transmitting the point cloud data may be dynamic adaptive streaming over HTTP (DASH) signaling. DASH is an adaptive bitrate streaming technology, and the technology may cause high-quality streaming media to be transferred over the Internet through a conventional HTTP network server.

Step S520: Parse the streaming media signaling, to obtain a temporal scale group identifier used for identifying a track group and carried in the streaming media signaling, where the track group includes one or more point cloud media tracks having the same point cloud content, and the track group includes some point cloud media tracks having different frame rates.

In the DASH signaling, frame rate indication information of a point cloud media track may be stored using an existing field. For example, frame rates of a plurality of different point cloud media tracks may be indicated using a frameRate field in the DASH signaling.

In an example of the present subject matter, point cloud media tracks with all frame rates belonging to the same gpts track group during file encapsulation may be identified through a group ID, for example, GPCC temporal scale group identifier (GPCCTemporalScaleGroupId) in the DASH signaling. The group ID element is a sub-element of an adaptation set element. The GPCCTemporalScaleGroupId element may occur at the adaptation set scale, but cannot occur at any other scale. Table 1 shows semantics and attributes of a GPCC temporal scale group ID in an example of the present subject matter.

TABLE 1

| Element | Use | Data type | Description |
|---|---|---|---|
| GPCCTemporalScaleGroupId | 0 . . . N | xs: unsignedShort | If one or more representations in an adaptation set correspondingly carry one or more tracks with different frame rates belonging to the same GPCC temporal scale group, a GPCC temporal scale group ID corresponding to the adaptation set is identified by the field. |

Step S530: Transmit a data transmission request to the data source according to the temporal scale group identifier.

According to the temporal scale group identifier carried in the streaming media signaling and obtained by parsing, one or more pieces of frame rate indication information may be selected from the quality indication information and used as a target frame rate, and the data transmission request corresponding to the target frame rate may be further transmitted to the data source. The data transmission request is, for example, a first data transmission request.

In an example of the present subject matter, the method for transmitting a data transmission request may include: obtaining a network bandwidth of performing data transmission with the data source; selecting one or more target point cloud media tracks having a target frame rate and matching the network bandwidth from the track group according to the temporal scale group identifier; and transmitting, to the data source, the data transmission request used for requesting to transmit the s.

In an example of the present subject matter, when the network bandwidth is greater than a set threshold, two or more target point cloud media tracks may be selected. When the network bandwidth is less than or equal to the set threshold, one target point cloud media track may be selected.

Step S540: Receive the point cloud file that is transmitted by the data source and that corresponds to the data transmission request.

When a data transmission request for one corresponding target point cloud media track is transmitted to the data source according to the temporal scale group identifier, the data source may transmit one corresponding target point cloud media track to the data receiver based on the request.

When a data transmission request for a plurality of corresponding target point cloud media tracks is transmitted to the data source according to the temporal scale group identifier, the data source may transmit a plurality of corresponding target point cloud media tracks having the same frame rate or different frame rates to the data receiver based on the request.

In an example of the present subject matter, by obtaining a plurality of point cloud files having the same frame rate, the point cloud files may be replaced or merged, to improve a presentation effect of the point cloud files.

In an example of the present subject matter, when a to-be-presented point cloud media track has a problem such as selection failure, decoding failure or poor point cloud quality obtained after decoding, the to-be-presented point cloud media track may be replaced with another point cloud media track having the same frame rate. For example, two point cloud files that have the same point cloud content and whose frame rates are both 30 fps may be replaced with each other.

In an example of the present subject matter, when the network environment of the data receiver is optimized and the network bandwidth is relatively high, a plurality of point cloud media tracks having the same frame rate may be merged, to improve the presentation frame rate of point cloud data. For example, two point cloud media tracks that have the same point cloud content and whose frame rates are both 30 fps may be merged to form a point cloud media track whose frame rate is 60 fps, thereby achieving a better point cloud file presentation effect by improving the frame rate.

In an example of the present subject matter, after the to-be-presented point cloud media track is selected from the point cloud file and decoded, if the point cloud file further includes another point cloud media track having the same frame rate, a method for replacing the point cloud media track may be performed: obtaining a frame rate of a to-be-presented point cloud media track; selecting another point cloud media track having the same frame rate as that of the to-be-presented point cloud media track from the point cloud file according to the frame rate indication information carried in the file encapsulation information; and replacing the to-be-presented point cloud media track with the another point cloud media track, to decode and present the another point cloud media track.

In an example of the present subject matter, after the to-be-presented point cloud media track is selected from the point cloud file and decoded, if the point cloud file further includes other point cloud media tracks having the same frame rate, a method for merging the point cloud media tracks may be performed: obtaining a frame rate of a to-be-presented point cloud media track; selecting one or more other point cloud media tracks having the same frame rate as that of the to-be-presented point cloud media track from the point cloud file according to the frame rate indication information carried in the file encapsulation information; and decoding the one or more other point cloud media tracks, and merging and presenting the one or more other point cloud media tracks and the to-be-presented point cloud media track.

In an example of the present subject matter, after the to-be-presented point cloud media track is selected from the point cloud file and decoded, if only one point cloud media track is encapsulated in the point cloud file, or a frame rate of each of other point cloud media tracks in the point cloud file is not consistent with that of the to-be-presented point cloud media track, a method for replacing the point cloud media track may be performed: obtaining a frame rate of a to-be-presented point cloud media track; transmitting a data transmission request (for example, a second data transmission request) to the data source, to receive a supplementary point cloud file transmitted by the data source, where the supplementary point cloud file includes another point cloud media track having the same point cloud content and the same frame rate as those of the to-be-presented point cloud media track; and replacing the to-be-presented point cloud media track with the another point cloud media track, to decode and present the another point cloud media track.

In an example of the present subject matter, after the to-be-presented point cloud media track is selected from the point cloud file and decoded, if only one point cloud media track is encapsulated in the point cloud file, or a frame rate of each of other point cloud media tracks in the point cloud file is not consistent with that of the to-be-presented point cloud media track, a method for merging the point cloud media tracks may be performed: obtaining a frame rate of a to-be-presented point cloud media track; transmitting a data transmission request (for example, a third data transmission request) to the data source, to receive a supplementary point cloud file transmitted by the data source, where the supplementary point cloud file includes one or more other point cloud media tracks having the same point cloud content and the same frame rate as those of the to-be-presented point cloud media track; and decoding the one or more other point cloud media tracks, and merging and presenting the one or more other point cloud media tracks and the to-be-presented point cloud media track.

Figure 6:
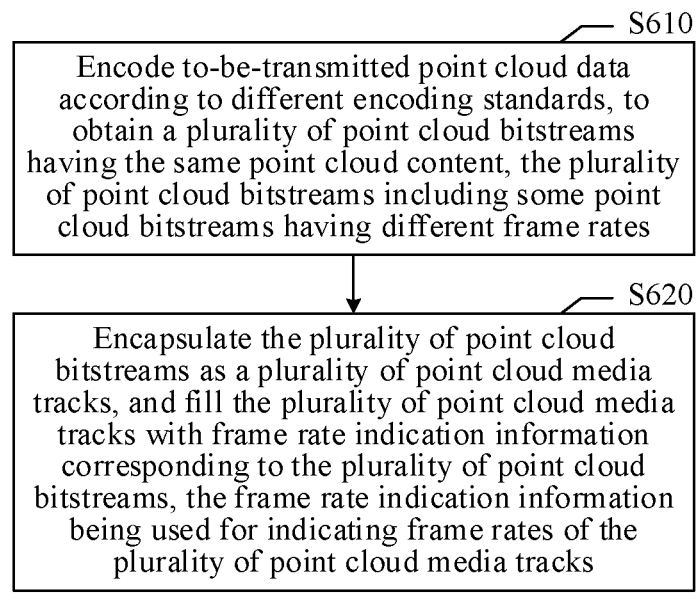
FIG. 6 is a step flowchart of a point cloud encoding method according to an example of the present subject matter.

FIG. 6 is a step flowchart of a point cloud encoding method according to an example of the present subject matter. The point cloud encoding method may be applied to links of a point cloud media system, such as a server, a client and an intermediate node. In this example of the present subject matter, the point cloud encoding method performed by a server device in which a point cloud encoding apparatus is installed is used as an example. As shown in FIG. 6, the point cloud encoding method may mainly include the following step S610 to step S620.

Step S610: Encode to-be-transmitted point cloud data according to different encoding standards, to obtain a plurality of point cloud bitstreams having the same point cloud content, the plurality of point cloud bitstreams including some point cloud bitstreams having different frame rates.

To meet frame rate requirements of different data receivers for point cloud data, point cloud data for a point cloud content may be encoded according to a plurality of different encoding standards to obtain a plurality of point cloud bitstreams having the same frame rate or different frame rates. The encoding standards may include parameter values of one or more quality parameters, and combinations of different parameter values of various quality parameters may form a plurality of different encoding standards. For example, when the quality parameter includes a bitrate and a frame rate, the bitrate includes two different bitrate values A1 and A2, and the frame rate also includes two different frame rate values B1 and B2, four encoding standards: A1B1, A1B2, A2B1 and A2B2 corresponding to different quality parameter values may be determined.

Step S620: Encapsulate the plurality of point cloud bitstreams as a plurality of point cloud media tracks, and fill the plurality of point cloud media tracks with frame rate indication information corresponding to the plurality of point cloud bitstreams, the frame rate indication information indicating frame rates of the plurality of point cloud media tracks.

Each point cloud media track has corresponding file encapsulation information, and the file encapsulation information may be an ISOBMFF data box generated when a point cloud bitstream is encapsulated as the point cloud media track, and may be, for example, a track group data box TrackGroupTypeBox obtained by extension. After the frame rate indication field corresponding to the frame rate indication information is determined in the file encapsulation information of the point cloud media track, the frame rate indication field in the file encapsulation information may be filled with the frame rate indication information corresponding to the point cloud bitstream with reference to the frame rate of the point cloud bitstream.

In an example of the present subject matter, after the point cloud bitstreams are encapsulated as point cloud media tracks, streaming media signaling used for transmitting the point cloud data may be generated according to a data transmission requirement; the streaming media signaling may be the DASH signaling in the above examples. The streaming media signaling is filled with a temporal scale group identifier used for identifying a track group, where the track group includes one or more point cloud media tracks having the same point cloud content, and the track group includes some point cloud media tracks having different frame rates. Then, the streaming media signaling is transmitted to the data receiver, to perform point cloud data transmission between the data source and the data receiver.

In an example of the present subject matter, after the data receiver responds to the streaming media signaling, the data source may receive a data transmission request generated based on the streaming media signaling and transmitted by the data receiver; and transmit a point cloud file to the data receiver according to the data transmission request, the point cloud file including one or more point cloud media tracks having the same point cloud content, and the point cloud file including some point cloud media tracks having different frame rates.

Figure 7:
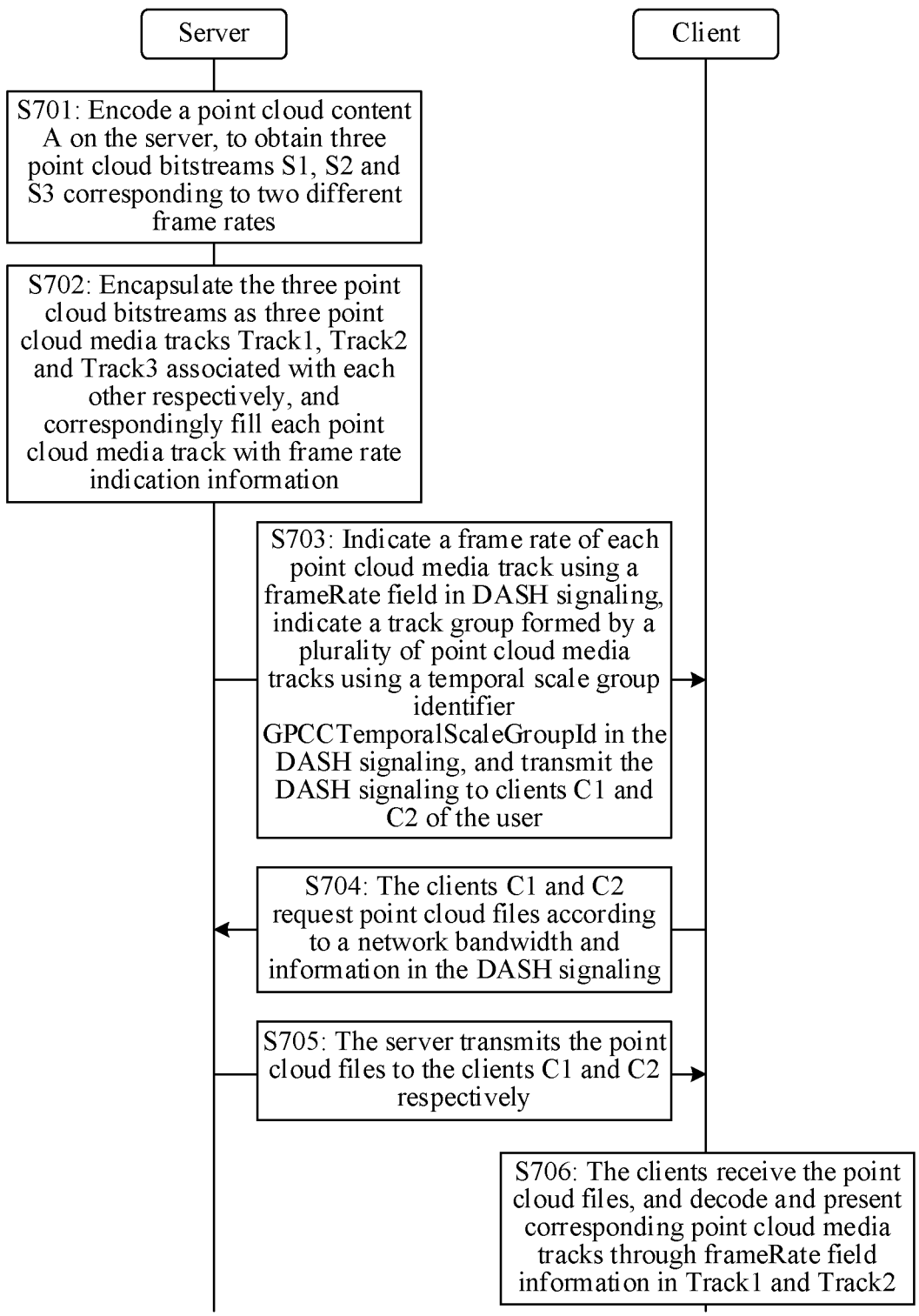
FIG. 7 is a step flowchart of performing point cloud data encoding and decoding in an application scenario according to an example of the present subject matter.

FIG. 7 is a step flowchart of performing point cloud data encoding and decoding in an application scenario according to an example of the present subject matter. As shown in FIG. 7, a server is used as a data source producing point cloud data, and a method for performing point cloud data transmission and encoding and decoding between the server and a client of a user may include the following steps.

Step S701: Encode a point cloud content A on the server, to obtain three point cloud bitstreams S1, S2 and S3 corresponding to two different frame rates. For example, a frame rate of the point cloud bitstream S1 is 60 fps, a frame rate of the point cloud bitstream S2 is 30 fps, and a frame rate of the point cloud bitstream S3 is also 30 fps.

Step S702: Encapsulate the three point cloud bitstreams as three point cloud media tracks Track1, Track2 and Track3 associated with each other respectively, and correspondingly fill each point cloud media track with frame rate indication information. For example, in a track group data box, a frame rate indication field of the point cloud media track Track1 is filled with frame_rate=60; a frame rate indication field of the point cloud media track Track2 is filled with frame_rate=30; a frame rate indication field of the point cloud media track Track3 is filled with frame_rate=30.

Step S703: Indicate a frame rate of each point cloud media track using a frameRate field in DASH signaling, indicate a track group formed by a plurality of point cloud media tracks using a temporal scale group identifier GPCCTemporalScaleGroupId in the DASH signaling, and transmit the DASH signaling to clients C1 and C2 of the user.

Step S704: The clients C1 and C2 request point cloud files according to a network bandwidth and information in the DASH signaling. The point cloud file requested by C1 includes the point cloud media track Track1. The point cloud file requested by C2 includes the point cloud media track Track2.

Step S705: The server transmits the point cloud files to the clients C1 and C2 respectively. The point cloud file transmitted by the server to the client C1 includes the point cloud media track Track1. The point cloud file transmitted by the server to the client C2 includes the point cloud media track Track2.

Step S706: The clients receive the point cloud files, and decode and present corresponding point cloud media tracks through frameRate field information in Track1 and Track2.

After the network state of the client C2 is improved, the point cloud media track Track3 may be further requested, and the point cloud media track Track2 and the point cloud media track Track3 are presented and consumed together, thereby achieving a point cloud presentation effect with a frame rate of 60 fps.

In the technical solutions provided in the examples of the present subject matter, by associating point cloud media resources having the same frame rate with point cloud media resources having different frame rates, a temporally progressive relationship of point cloud media is constructed. Based on this temporally progressive relationship, when consuming point cloud media, a user may request a corresponding point cloud file as required, thereby saving the transmission bandwidth.

Although the steps of the method in the present subject matter are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

The following describes apparatus examples of the present subject matter, and the apparatus examples may be used for performing the point cloud encoding and decoding method in the foregoing examples of the present subject matter.

Figure 8:
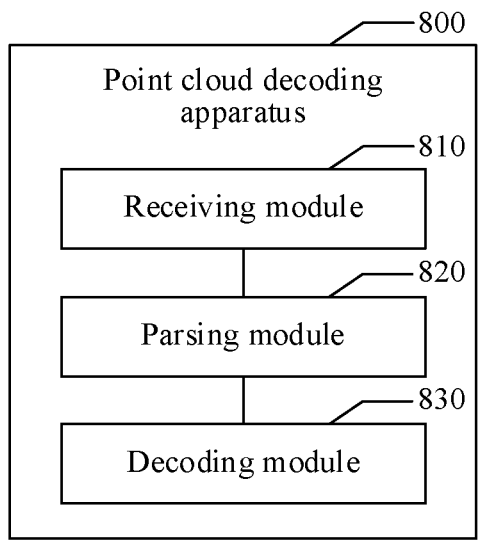
FIG. 8 is a schematic structural block diagram of a point cloud decoding apparatus according to an example of the present subject matter.

FIG. 8 is a schematic structural block diagram of a point cloud decoding apparatus according to an example of the present subject matter. As shown in FIG. 8, the point cloud decoding apparatus 800 may mainly include: a receiving module 810, configured to receive a point cloud file transmitted by a data source, the point cloud file including one or more point cloud media tracks having the same point cloud content, and the point cloud file including some point cloud media tracks having different frame rates; a parsing module 820, configured to parse file encapsulation information of the one or more point cloud media tracks, to obtain frame rate indication information carried in the file encapsulation information, the frame rate indication information indicating frame rates of the one or more point cloud media tracks; and a decoding module 830, configured to select and decode a point cloud media track with a designated frame rate from the point cloud file according to the frame rate indication information carried in the file encapsulation information.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some examples of the present subject matter, based on the above examples, the receiving module 810 includes: a signaling receiving unit, configured to receive streaming media signaling that is transmitted by the data source and that is used for transmitting point cloud data; a signaling parsing unit, configured to parse the streaming media signaling, to obtain a temporal scale group identifier used for identifying a track group and carried in the streaming media signaling, where the track group includes one or more point cloud media tracks having the same point cloud content, and the track group includes some point cloud media tracks having different frame rates; a request transmitting unit, configured to transmit a first data transmission request to the data source according to the temporal scale group identifier; and a file receiving unit, configured to receive the point cloud file that is transmitted by the data source and that corresponds to the first data transmission request.

In some examples of the present subject matter, based on the above examples, the request transmitting unit includes: a bandwidth obtaining subunit, configured to obtain a network bandwidth of performing data transmission with the data source; a track selecting subunit, configured to select one or more target point cloud media tracks having a target frame rate and matching the network bandwidth from the track group according to the temporal scale group identifier; and a request transmitting subunit, configured to transmit, to the data source, the first data transmission request used for requesting to transmit the one or more target point cloud media tracks.

In some examples of the present subject matter, based on the above examples, the parsing module 820 includes: an information parsing unit, configured to parse the file encapsulation information of the one or more point cloud media tracks, to determine frame rate indication fields corresponding to frame rates of the one or more point cloud media tracks; and an information determining unit, configured to determine the frame rate indication information of the one or more point cloud media tracks according to values of the frame rate indication fields.

In some examples of the present subject matter, based on the above examples, the point cloud decoding apparatus 800 further includes: a frame rate obtaining module, configured to obtain a frame rate of a to-be-presented point cloud media track; a track selecting module, configured to select another point cloud media track having the same frame rate as that of the to-be-presented point cloud media track from the point cloud file according to the frame rate indication information carried in the file encapsulation information; and a first replacing module, configured to replace the to-be-presented point cloud media track with the another point cloud media track, to decode and present the another point cloud media track.

In some examples of the present subject matter, based on the above examples, the point cloud decoding apparatus 800 further includes: a frame rate obtaining module, configured to obtain a frame rate of a to-be-presented point cloud media track; a track selecting module, configured to select one or more other point cloud media tracks having the same frame rate as that of the to-be-presented point cloud media track from the point cloud file according to the frame rate indication information carried in the file encapsulation information; and a first merging module, configured to decode the one or more other point cloud media tracks, and merge and present the one or more other point cloud media tracks and the to-be-presented point cloud media track.

In some examples of the present subject matter, based on the above examples, the point cloud decoding apparatus 800 further includes: a frame rate obtaining module, configured to obtain a frame rate of a to-be-presented point cloud media track; a file obtaining module, configured to transmit a second data transmission request to the data source, to receive a supplementary point cloud file transmitted by the data source, where the supplementary point cloud file includes another point cloud media track having the same point cloud content and the same frame rate as those of the to-be-presented point cloud media track; and a second replacing module, configured to replace the to-be-presented point cloud media track with the another point cloud media track, to decode and present the another point cloud media track.

In some examples of the present subject matter, based on the above examples, the point cloud decoding apparatus 800 further includes: a frame rate obtaining module, configured to obtain a frame rate of a to-be-presented point cloud media track; a file obtaining module, configured to transmit a third data transmission request to the data source, to receive a supplementary point cloud file transmitted by the data source, where the supplementary point cloud file includes one or more other point cloud media tracks having the same point cloud content and the same frame rate as those of the to-be-presented point cloud media track; and a second merging module, configured to decode the one or more other point cloud media tracks, and merge and present the one or more other point cloud media tracks and the to-be-presented point cloud media track.

Figure 9:
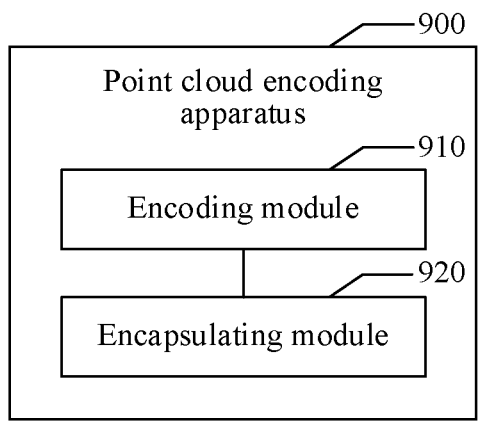
FIG. 9 is a schematic structural block diagram of a point cloud encoding apparatus according to an example of the present subject matter.

FIG. 9 is a schematic structural block diagram of a point cloud encoding apparatus according to an example of the present subject matter. As shown in FIG. 9, the point cloud encoding apparatus 900 may mainly include: an encoding module 910, configured to encode to-be-transmitted point cloud data according to different encoding standards, to obtain a plurality of point cloud bitstreams having the same point cloud content, the plurality of point cloud bitstreams including some point cloud bitstreams having different frame rates; and an encapsulating module 920, configured to encapsulate the plurality of point cloud bitstreams as a plurality of point cloud media tracks, and fill the plurality of point cloud media tracks with frame rate indication information corresponding to the plurality of point cloud bitstreams, the frame rate indication information indicating frame rates of the plurality of point cloud media tracks.

In some examples of the present subject matter, based on the above examples, the point cloud encoding apparatus 900 further includes: a signaling generating module, configured to generate streaming media signaling used for transmitting the point cloud data; a signaling filling module, configured to fill the streaming media signaling with a temporal scale group identifier used for identifying a track group, where the track group includes one or more point cloud media tracks having the same point cloud content, and the track group includes some point cloud media tracks having different frame rates; a signaling transmitting module, configured to transmit the streaming media signaling to a data receiver.

In some examples of the present subject matter, based on the above examples, the point cloud encoding apparatus 900 further includes: a request receiving module, configured to receive a data transmission request generated based on the streaming media signaling and transmitted by the data receiver; and a file transmission module, configured to transmit a point cloud file to the data receiver according to the data transmission request, the point cloud file including one or more point cloud media tracks having the same point cloud content, and the point cloud file including some point cloud media tracks having different frame rates.

In some examples of the present subject matter, based on the above examples, the encapsulating module 920 includes: an information determining unit, configured to determine, in file encapsulation information of the plurality of point cloud media tracks, frame rate indication fields corresponding to the frame rate indication information; and an information filling unit, configured to fill the frame rate indication fields in the file encapsulation information with the frame rate indication information corresponding to the plurality of point cloud bitstreams.

Details of the point cloud encoding and decoding apparatus provided in the examples of the present subject matter have been specifically described in the corresponding method example. Details are not described herein again.

Figure 10:
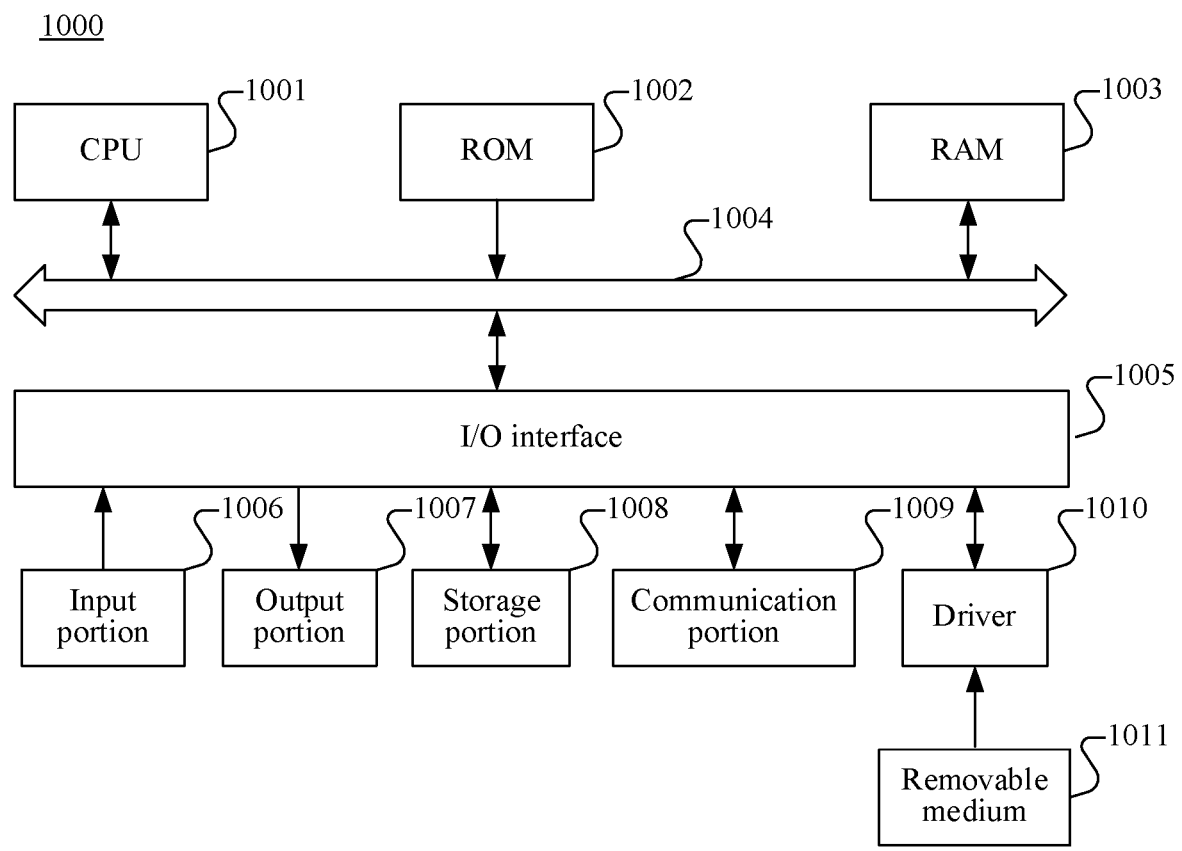
FIG. 10 is a schematic structural block diagram of a computer system configured to implement an electronic device according to an example of the present subject matter.

FIG. 10 is a schematic structural block diagram of a computer system configured to implement an electronic device according to an example of the present subject matter.

A computer system 1000 of the electronic device shown in FIG. 10 is merely an example, and does not constitute any limitation on functions and use ranges of the examples of the present subject matter.

As shown in FIG. 10, the computer system 1000 includes a central processing unit (CPU) 1001 that may perform various appropriate actions and processing according to a program stored in a read-only memory (ROM) 1002 or a program loaded from a storage portion 1008 into a random access memory (RAM) 1003. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following members are connected to the I/O interface 1005: an input portion 1006 including a keyboard, a mouse, and the like; an output portion 1007 including, such as, a cathode ray tube (CRT), a liquid crystal display (LCD), and a speaker; the storage portion 1008 including a hard disk or the like; and a communication portion 1009 including a network interface card such as a local area network card and a modem. The communication part 1009 performs communication processing by using a network such as the Internet. A driver 1010 is also connected to the I/O interface 1005 as required. A removable medium 1011, such as a magnetic disk, an optical disc, a magneto-optical disk, or a semiconductor memory, is mounted on the driver 1010 as required, so that a computer program read from the removable medium is installed into the storage part 1008 as required.

Particularly, according to an example of the present subject matter, the processes described in the method flowcharts may be implemented as computer software programs. For example, the examples of the present subject matter include a computer program product, the computer program product includes a computer program carried on a non-transitory computer-readable medium, and the computer program includes program code used for performing the methods shown in the flowcharts. In such an example, the computer program may be downloaded and installed from a network through the communication part 1009, and/or installed from the removable medium 1011. When the computer program is executed by the CPU 1001, the various functions defined in the system of the present subject matter are executed.

The non-transitory computer-readable storage medium may be, for example, but is not limited to, an electric, magnetic, optical, electromagnetic, infrared, or semi-conductive system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present subject matter, the computer-readable storage medium may be any tangible medium including or storing a program, and the program may be used by or in combination with an instruction execution system, apparatus, or device.

Other examples of the present subject matter will be apparent to a person skilled in the art from consideration of the specification and practice of the application here. The present subject matter is intended to cover any variation, use, or adaptive change of the present subject matter. These variations, uses, or adaptive changes follow the general principles of the present subject matter and include common general knowledge or common technical means in the art that are not disclosed in the present subject matter.

The present subject matter is not limited to the precise structures described above and shown in the accompanying drawings, and various modifications and changes can be made without departing from the scope of the present subject matter. The scope of the present subject matter is subject only to the appended claims.

What is claimed is:

1. A point cloud decoding method, comprising:
receiving a point cloud file transmitted by a data source, wherein the point cloud file comprises:
one or more point cloud media tracks having the same point cloud content, and
one or more point cloud media tracks having different frame rates;
parsing file encapsulation information of the point cloud media tracks to obtain frame rate indication information carried in the file encapsulation information, wherein the frame rate indication information indicates frame rates of the point cloud media tracks;
selecting and decoding a point cloud media track with a designated frame rate from the point cloud file according to the frame rate indication information carried in the file encapsulation information; and
after the selecting and decoding a point cloud media track with a designated frame rate from the point cloud file according to the frame rate indication information carried in the file encapsulation information:
obtaining a frame rate of a to-be-presented point cloud media track;
selecting one or more other point cloud media tracks having the same frame rate as that of the to-be-presented point cloud media track from the point cloud file according to the frame rate indication information carried in the file encapsulation information;

decoding the other point cloud media tracks; and
merging and presenting the one or more other point cloud media tracks and the to-be-presented point cloud media track.

2. The point cloud decoding method according to claim 1, wherein the receiving a point cloud file transmitted by a data source comprises:
receiving streaming media signaling transmitted by the data source and used for transmitting point cloud data;
parsing the streaming media signaling to obtain a temporal scale group identifier used for identifying a track group and carried in the streaming media signaling, wherein the track group comprises:
one or more point cloud media tracks having the same point cloud content, and
one or more point cloud media tracks having different frame rates;
transmitting a data transmission request to the data source according to the temporal scale group identifier; and
receiving the point cloud file that is transmitted by the data source and that corresponds to the data transmission request.

3. The point cloud decoding method according to claim 2, wherein the transmitting a data transmission request to the data source according to the temporal scale group identifier comprises:
obtaining a network bandwidth of data transmission with the data source;
selecting one or more target point cloud media tracks having a target frame rate and matching the network bandwidth from the track group according to the temporal scale group identifier; and
transmitting, to the data source, the data transmission request used for requesting to transmit the target point cloud media tracks.

4. The point cloud decoding method according to claim 2, wherein the data transmission request is a first data transmission request, wherein after the selecting and decoding a point cloud media track with a designated frame rate from the point cloud file according to the frame rate indication information carried in the file encapsulation information, the method further comprises:
transmitting a second data transmission request to the data source to receive a supplementary point cloud file transmitted by the data source, wherein the supplementary point cloud file comprises the one or more other point cloud media tracks having the same point cloud content and the same frame rate as those of the to-be-presented point cloud media track;
decoding the other point cloud media tracks; and
merging and presenting the one or me more other point cloud media tracks having the same point cloud content and the same frame rate as those of the to-be-presented point cloud media track and the to-be-presented point cloud media track.

5. The point cloud decoding method according to claim 1, wherein the parsing file encapsulation information of the point cloud media tracks to obtain frame rate indication information carried in the file encapsulation information comprises:
parsing the file encapsulation information of the point cloud media tracks to determine frame rate indication fields corresponding to frame rates of the point cloud media tracks; and
determining the frame rate indication information of the point cloud media tracks according to values of the frame rate indication fields.

6. A point cloud decoding apparatus, comprising:
a memory storing instructions; and
a processor configured to execute the instructions, and wherein upon execution of the instructions, the processor is configured to cause the point cloud decoding apparatus to:
receive a point cloud file transmitted by a data source, wherein the point cloud file comprises:
one or more point cloud media tracks having the same point cloud content, and
one or more point cloud media tracks having different frame rates;
parse file encapsulation information of the point cloud media tracks to obtain frame rate indication information carried in the file encapsulation information, wherein
the frame rate indication information indicates frame rates of the point cloud media tracks;
select and decode a point cloud media track with a designated frame rate from the point cloud file according to the frame rate indication information carried in the file encapsulation information;
obtain a frame rate of a to-be-presented point cloud media track;
select another point cloud media track having the same frame rate as that of the to-be-presented point cloud media track from the point cloud file according to the frame rate indication information carried in the file encapsulation information; and
replace the to-be-presented point cloud media track with the another point cloud media track to decode and present the another point cloud media track.

7. The point cloud decoding apparatus of claim 6, wherein the processor, upon execution of the instructions, is further configured to:
receive streaming media signaling that is transmitted by the data source and that is used for transmitting point cloud data;
parse the streaming media signaling to obtain a temporal scale group identifier used for identifying a track group and carried in the streaming media signaling, wherein
the track group includes one or more point cloud media tracks having the same point cloud content, and
the track group includes one or more point cloud media tracks having different frame rates;
transmit a data transmission request to the data source according to the temporal scale group identifier; and
receive the point cloud file that is transmitted by the data source and that corresponds to the data transmission request.

8. The point cloud decoding apparatus of claim 7, wherein the processor, upon execution of the instructions, is further configured to:
obtain a network bandwidth for data transmission with the data source;
select one or more target point cloud media tracks having a target frame rate and matching the network bandwidth from the track group according to the temporal scale group identifier; and
transmit, to the data source, the data transmission request used for requesting to transmit the one or more target point cloud media tracks.

9. The point cloud decoding apparatus according to claim 7, wherein the data transmission request is a first data transmission request, and wherein after the selection and decoding of a point cloud media track with a designated frame rate from the point cloud file according to the frame rate indication information carried in the file encapsulation information, the processor, upon execution of the plurality of instructions, is further configured to cause the apparatus to:

transmit a second data transmission request to the data source to receive a supplementary point cloud file transmitted by the data source, wherein the supplementary point cloud file comprises another point cloud media track having the same point cloud content and the same frame rate as those of the to-be-presented point cloud media track; and replacing the to-be-presented point cloud media track with the another point cloud media track having the same point cloud content and the same frame rate as those of the to-be-presented point cloud media track to decode and present the another point cloud media track.

10. The point cloud decoding apparatus of claim 6, wherein the processor, upon execution of the instructions, is further configured to:

parse the file encapsulation information of the one or more point cloud media tracks to determine frame rate indication fields corresponding to frame rates of the one or more point cloud media tracks; and determine the frame rate indication information of the one or more point cloud media tracks according to values of the frame rate indication fields.

11. A point cloud decoding apparatus, comprising:
a memory storing instructions; and
a processor configured to execute the instructions, and wherein upon execution of the instructions, the processor is configured to cause the apparatus to:
 receive a point cloud file transmitted by a data source, wherein the point cloud file comprises:
  one or more point cloud media tracks having the same point cloud content, and
  one or more point cloud media tracks having different frame rates;
 parse file encapsulation information of the point cloud media tracks to obtain frame rate indication information carried in the file encapsulation information, wherein the frame rate indication information indicates frame rates of the point cloud media tracks;
 select and decode a point cloud media track with a designated frame rate from the point cloud file according to the frame rate indication information carried in the file encapsulation information; and
after the selection and decoding of the point cloud media track with the designated frame rate from the point cloud file according to the frame rate indication information carried in the file encapsulation information:
 obtain a frame rate of a to-be-presented point cloud media track;
 select one or more other point cloud media tracks having the same frame rate as that of the to-be-presented point cloud media track from the point cloud file according to the frame rate indication information carried in the file encapsulation information;
 decoding the other point cloud media tracks; and
  merge and present the one or more other point cloud media tracks and the to-be-presented point cloud media track.

12. The point cloud decoding apparatus according to claim 11, wherein the processor, upon execution of the instructions, is further configured to cause the apparatus to:

receive streaming media signaling transmitted by the data source and used for transmitting point cloud data;

parse the streaming media signaling to obtain a temporal scale group identifier used for identifying a track group and carried in the streaming media signaling, wherein the track group comprises:
 one or more point cloud media tracks having the same point cloud content, and
 one or more point cloud media tracks having different frame rates;

transmit a data transmission request to the data source according to the temporal scale group identifier; and receive the point cloud file that is transmitted by the data source and that corresponds to the data transmission request.

13. The point cloud decoding apparatus according to claim 12, wherein the processor, upon execution of the instructions, is further configured to cause the apparatus to:

obtain a network bandwidth of data transmission with the data source;

select one or more target point cloud media tracks having a target frame rate and matching the network bandwidth from the track group according to the temporal scale group identifier; and transmit, to the data source, the data transmission request used for requesting to transmit the target point cloud media tracks.

14. The point cloud decoding apparatus according to claim 11, wherein the processor, upon execution of the instructions, is further configured to cause the apparatus to:

parse the file encapsulation information of the point cloud media tracks to determine frame rate indication fields corresponding to frame rates of the point cloud media tracks; and determine the frame rate indication information of the point cloud media tracks according to values of the frame rate indication fields.

15. The point cloud decoding method according to claim 11, wherein the data transmission request is a first data transmission request, wherein after the selection and decoding of a point cloud media track with a designated frame rate from the point cloud file according to the frame rate indication information carried in the file encapsulation information, the processor, upon execution of the instructions, is further configured to cause the apparatus to:

transmit a second data transmission request to the data source to receive a supplementary point cloud file transmitted by the data source, wherein the supplementary point cloud file comprises one or more other point cloud media tracks having the same point cloud content and the same frame rate as those of the to-be-presented point cloud media track;

decoding the other point cloud media tracks having the same point cloud content and the same frame rate as those of the to-be-presented point cloud media track; and merge and present the one or me more other point cloud media tracks having the same point cloud content and the same frame rate as those of the to-be-presented point cloud media track and the to-be-presented point cloud media track.

* * * * *